(12) United States Patent
Joos

(10) Patent No.: US 10,676,105 B2
(45) Date of Patent: Jun. 9, 2020

(54) ELECTROMECHANICAL DRIVE

(71) Applicant: AFT AUTOMATISIERUNGS- UND FÖRDERTECHNIK GMBH & CO., KG, Schopfheim (DE)

(72) Inventor: Dirk Joos, Schopfheim (DE)

(73) Assignee: AFT AUTOMATISIERUNGS-UND FÖRDERTECHNIK GMBH & CO. KG, Schopfheim (DE)

( * ) Notice: Subject to any disclaimer, the term of this patent is extended or adjusted under 35 U.S.C. 154(b) by 150 days.

(21) Appl. No.: 15/572,255

(22) PCT Filed: May 6, 2016

(86) PCT No.: PCT/EP2016/060147
§ 371 (c)(1),
(2) Date: Nov. 7, 2017

(87) PCT Pub. No.: WO2016/180720
PCT Pub. Date: Nov. 17, 2016

(65) Prior Publication Data
US 2018/0111629 A1   Apr. 26, 2018

(30) Foreign Application Priority Data

May 8, 2015   (DE) .......................... 10 2015 107 195
Jul. 9, 2015   (DE) .......................... 10 2015 111 124

(51) Int. Cl.
*B61B 3/02*   (2006.01)
*B60L 5/40*   (2006.01)
(Continued)

(52) U.S. Cl.
CPC ................. *B61B 3/02* (2013.01); *B60L 5/40* (2013.01); *B60M 7/00* (2013.01); *B60L 2200/26* (2013.01);
(Continued)

(58) Field of Classification Search
CPC ... B61B 3/02; B60L 5/40; B60M 7/00; H02K 7/00; H02K 7/14
See application file for complete search history.

(56) References Cited

U.S. PATENT DOCUMENTS

2009/0013899 A1*   1/2009   Wolf ....................... B60L 5/005
                                                        104/288
2016/0332523 A1*  11/2016   Wada ...................... B60L 5/005
(Continued)

FOREIGN PATENT DOCUMENTS

DE   1808210 A   6/1970
DE   6608459 U  10/1971
(Continued)

*Primary Examiner* — Jason C Smith
(74) *Attorney, Agent, or Firm* — Hudak, Shunk & Farine Co. LPA

(57) ABSTRACT

A mechanical-electrical drive for a conveying element which can be operated in a power network with an AC voltage of between 350 volts [V] and 450 volts [V]. The mechanical-electrical drive has an electrical drive motor with a motor shaft and a drive wheel, coupled to the motor shaft in positive and/or negative fit, and a control and regulating unit for the electrical drive motor. The electrical drive motor and the drive wheel can be positioned on a conveying vehicle. It is intended that the mechanical-electrical drive should be capable of integration into existing AC power systems, with lower weight and smaller dimensions have a better degree of efficiency, and at the same time also have a lower maintenance requirement. For this purpose the electrical drive motor, which includes a housing, is configured as a brushless permanent magnet synchronous motor, wherein the drive wheel is coupled free of transmission to the motor shaft.

12 Claims, 2 Drawing Sheets

(51) Int. Cl.
  *B60M 7/00*   (2006.01)
  *H02K 7/14*   (2006.01)
  *H02K 11/33*  (2016.01)
  *H02K 7/06*   (2006.01)
  *H02K 5/22*   (2006.01)
  *H02K 7/00*   (2006.01)

(52) U.S. Cl.
  CPC .............. *H02K 5/22* (2013.01); *H02K 7/006* (2013.01); *H02K 7/06* (2013.01); *H02K 7/14* (2013.01); *H02K 11/33* (2016.01)

(56) References Cited

U.S. PATENT DOCUMENTS

| | | | |
|---|---|---|---|
| 2017/0096148 A1* | 4/2017 | Tomida | B60L 5/005 |
| 2018/0099680 A1* | 4/2018 | Murakami | B61B 3/02 |
| 2018/0100274 A1* | 4/2018 | Horii | B61B 3/02 |
| 2018/0105361 A1* | 4/2018 | Horii | B61B 3/02 |
| 2018/0111629 A1* | 4/2018 | Joos | B61B 3/02 |
| 2018/0122671 A1* | 5/2018 | Niiyama | H01L 21/67775 |
| 2018/0297620 A1* | 10/2018 | Murakami | B61B 10/02 |
| 2019/0241202 A1* | 8/2019 | Thomas | B61B 3/02 |

FOREIGN PATENT DOCUMENTS

| | | |
|---|---|---|
| DE | 8219521 U1 | 6/1983 |
| DE | 102005033396 A1 | 1/2007 |
| DE | 102013000852 A1 | 7/2014 |
| EP | 0379206 A2 | 7/1990 |
| JP | 4147600 B2 | 7/1999 |
| WO | 2007036267 A1 | 4/2007 |
| WO | 2014183191 A1 | 11/2014 |

\* cited by examiner

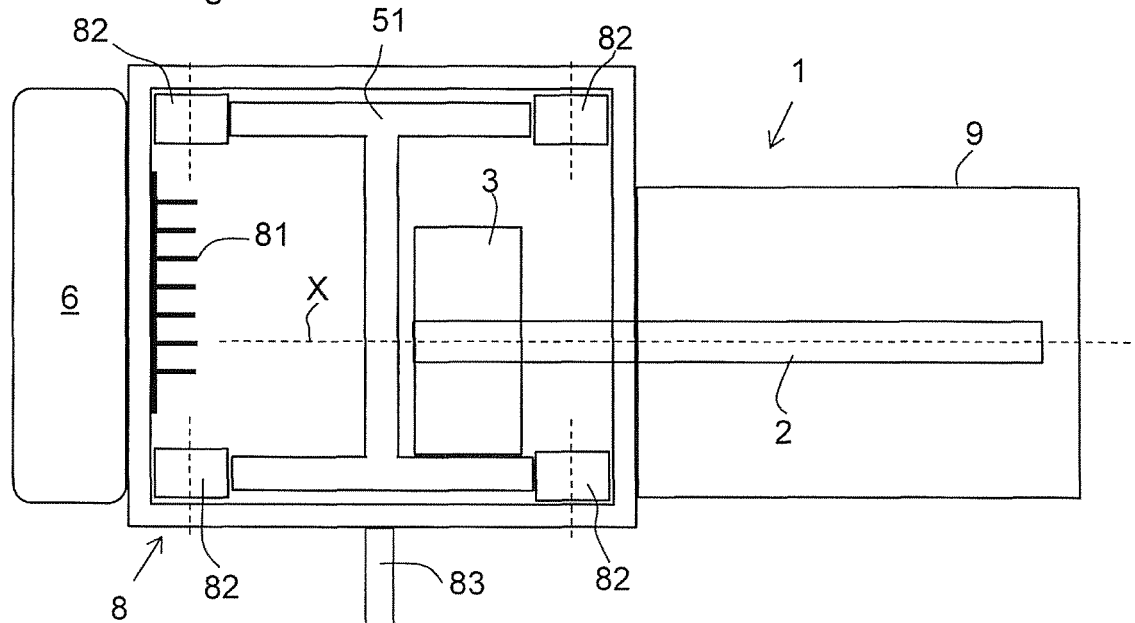
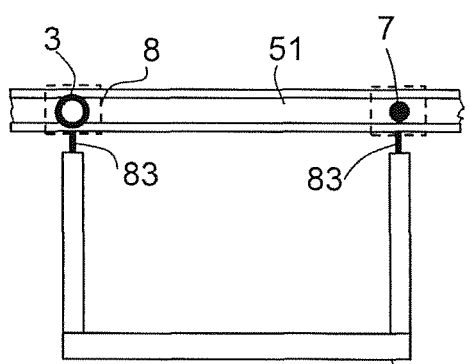
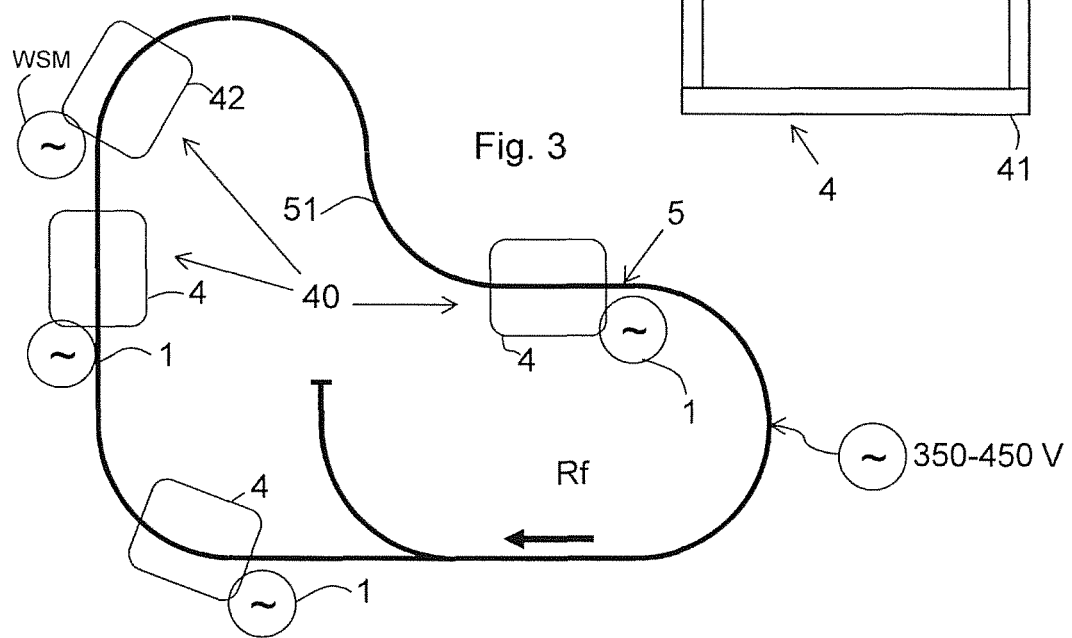

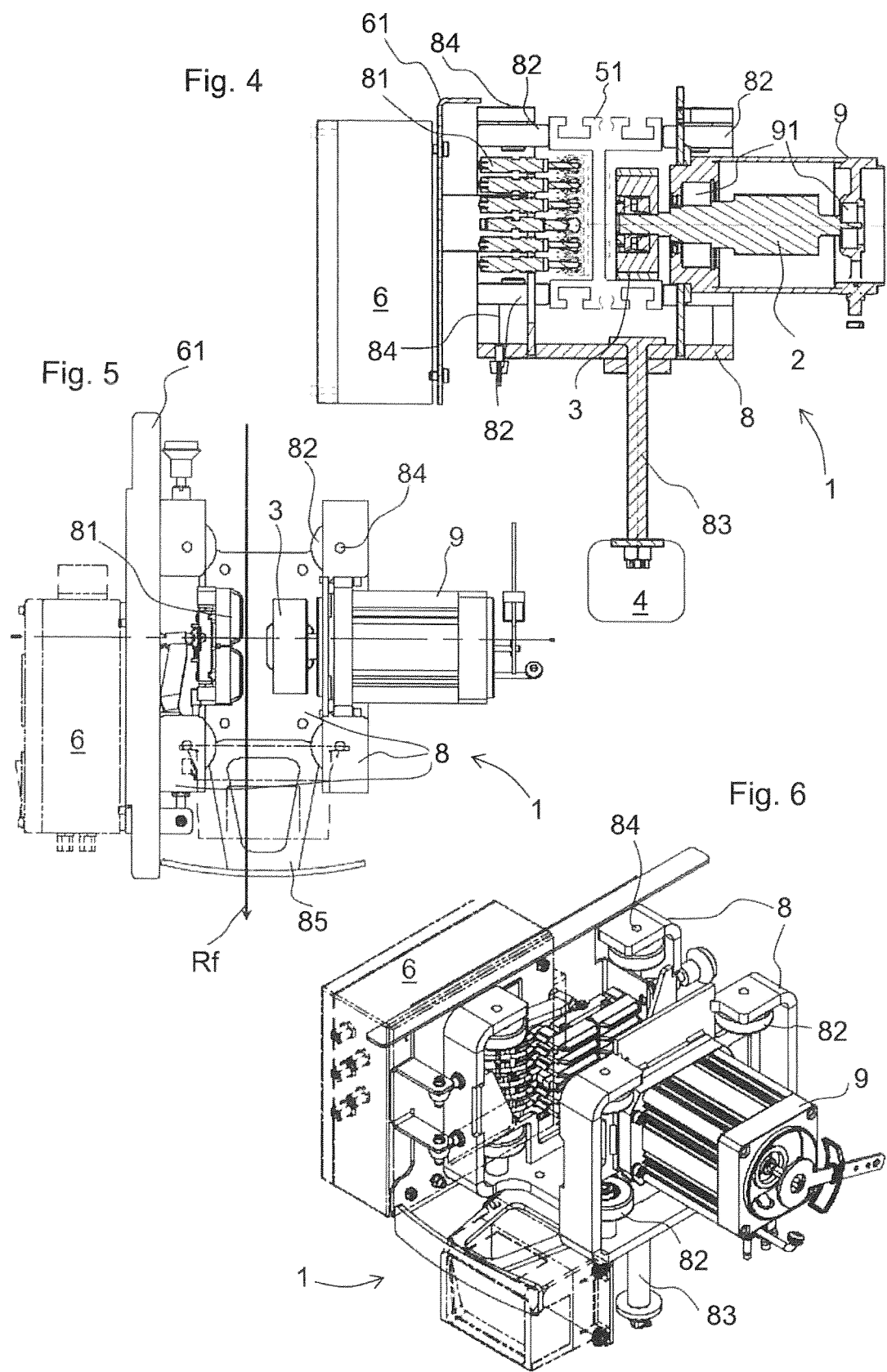

ELECTROMECHANICAL DRIVE

FIELD OF THE INVENTION

The invention relates to a mechanical-electrical drive for a conveying element which can be operated in a power network with an AC voltage of between 350 volts [V] and 450 volts [V], consisting of an electric drive motor comprising a motor shaft and a control and regulating unit for the electrical drive motor.

BACKGROUND OF THE INVENTION

Generic mechanical-electrical drives are known from the prior art, with which the electrical drive motor is flanged to a gear unit and the drive wheel is connected by a gear shaft to the motor shaft.

Described in DE 66 08 459 U are drives for an electric overhead track, with which a hydrostatic gear system is connected downstream of the DC motor. This is intended to compensate for the disadvantage that with revolution speed-regulated permanent magnet synchronous motors the output is reduced as the revolution speed falls.

According to DE 82 19 521 U1, gear systems with multiple functions are connected downstream of the electrical drive motor.

SUMMARY OF THE INVENTION

The invention is based on the object of configuring and arranging a mechanical-electrical drive in such a way that it can be integrated into existing AC power systems, with lower weight and smaller dimensions has a better degree of efficiency, and at the same time also has a lower maintenance requirement.

The object is resolved according to the invention in that not more than one drive wheel is coupled mechanically in positive and/or non-positive fit to the motor shaft, and a control and regulating unit for the electrical drive motor, wherein the electrical drive motor and the drive wheel can be positioned on a conveying element. By means of the drive wheel, a drive torque moment can be transferred onto a stationary component. The electrical drive motor, which comprises a housing, is configured as a brushless permanent magnet synchronous motor, and the drive wheel is coupled free of any transmission to the motor shaft. The drive wheel drives the system, with which the permanent magnet synchronous motor is connected, configured in positive fit as a gear wheel or, preferably, configured in frictional resistance as a plastic wheel, by way of a corresponding rail.

By the use of a brushless permanent magnet synchronous motor, the situation is achieved in which the permanent magnet synchronous motor attains the performance characteristic necessary for the drive, and, without step-up transmission or reduction by means of a gear, in many ranges achieves the necessary torque values. Due to the transmission-free drive arrangement, it is also possible to utilize simultaneously the advantages of using the permanent magnet synchronous motor, without any substantial effort, as a generator, and therefore as an operational brake for the conveying vehicle.

With regard to the drive, it can also be advantageous if the drive wheel and the motor shaft are arranged coaxially to an axis of rotation, wherein the drive wheel is coupled indirectly or directly to the motor shaft. Such a coupling can be achieved by a shaft of the drive wheel or another damping element. Due to the fact that no gear system has to be used, the motor shaft can be coupled directly to the drive wheel, such that they both run coaxially. The characteristic of the permanent magnet synchronous motor allows for a direct and rigid coupling by way of a shaft without a damping element.

As a result of a positive-fit and transmission-free coupling, without a gear, the degree of efficiency of the mechanical-electrical drive can be increased, as a ratio of the electrical input power to the drive power output at the drive wheel taking effect on the degree of efficiency of the permanent magnet synchronous motor. This corresponds to approximately 98%. As a result of this the situation is achieved that the degree of efficiency of an element arranged between the motor shaft and the drive wheel for the transfer of the torque amounts to 100%, wherein the degree of efficiency is defined as the ratio of the torque taken off the drive wheel to the torque output from the motor shaft.

With regard to an advantageous characteristic curve, it can be provided that the electrical drive motor has a capacity of between 100 watts [W] and 200 watts [W] or between 250 watts [W] and 1000 watts [W]. Such permanent magnet synchronous motors located in the lower to medium power range can be adjusted particularly easily to the desired characteristic curves.

Such a mechanical-electrical drive is advantageous for a system consisting of one or more conveying vehicles or a conveying element, in each with a mechanical-electrical drive. Such a system comprises, for example, belt conveyors, toothed belt conveyors, rail-less ground conveying vehicles, or rail-mounted ground conveying vehicles, as well as, particularly preferably, electrical overhead track vehicles.

For a flexible replacement, it is advantageous for the conveying element to be configured as a conveying vehicle or an electrical overhead track vehicle for use within a conveying path, and a carrier is provided on the conveying element, on which the electrical drive motor is mounted by way of its housing, wherein the entire weight force taking effect on the carrier is transferred via the housing and the motor shaft onto the drive wheel. Due to the fact that no gear is used, the bearing mounting of the permanent magnet synchronous motor is changed according to the invention in such a way that it can take over the task of the gear.

It can be advantageous in this respect if a number of sliding contacts are arranged on the carrier for a transfer of the AC voltage from the power network to the control and regulating unit, as well as a number of guide rollers for guiding the carrier in a direction parallel to the axis of rotation. Such a unit can be easily replaced, in order, for example, to replace the entire conveying vehicle.

It can be of particular significance for the present invention if a guidance system or a rail system and the control and regulating unit are provided for the electrical overhead track, wherein the guidance system or rail system has an operational voltage of between 350 volts [V] and 450 volts [V] AC. According to the invention, a belt conveyor can likewise be operated with the existing AC voltage network, as well as an electrical overhead track.

In connection with the configuration and arrangement according to the invention, it can be of advantage if the guidance system or the rail system forms at least one closed conveying system for the conveying vehicle. With such closed conveying paths, all the advantages of the drive according to the invention can be used.

It is particularly advantageous if, next to the sole drive wheel of the mechanical-electrical drive, a maximum of one driveless roller is provided, and the entire weight of the electrical overhead track can be transferred via the sole drive wheel and the driveless roller onto the rail system.

It can also be advantageous if the rail system has at least one suspended rail, and the electrical drive motor is positioned in the axial direction of the axis of rotation, next to the rail. The smaller drive unit according to the invention allows for such a positioning, since in curve areas it will pivot outwards adequately little. A positioning above the rail is not necessary due to the small structure size.

With regard to the retrofitting of existing systems with an AC motor as the drive motor, it is advantageous for such a system according to the invention to be combined with at least one auxiliary conveying vehicle driven by an AC motor. The auxiliary conveying vehicle is therefore operated in the same guidance system or rail system as the conveying vehicle. For the auxiliary conveying vehicle an AC voltage is in any event necessary, such that, with a corresponding control and regulating unit, the auxiliary conveying vehicle can travel in the system according to the invention.

Due to the fact that the mechanical-electrical drive with a permanent magnet synchronous motor without a gear unit has a very small structure size, it can advantageously be used with the drives of conveying vehicles, but in particular with electrical overhead tracks, since in this context, specifically in curve areas, a small structure size advantageously has a substantially lesser outwards pivot movement of the mechanical-electrical drive on tight curves, and this allows for a compact structural arrangement of the rail system with all the peripheral devices.

BRIEF DESCRIPTION OF THE DRAWINGS

Further advantages and details of the invention are explained in the claims and in the description and represented in the figures. The figures show:

FIG. 1 a principle sketch of a mechanical-electrical drive;

FIG. 2 a principle sketch of an electric overhead track;

FIG. 3 a principle sketch of a system consisting of an electric overhead track with a rail system;

FIG. 4 a side view of a mechanical-electrical drive;

FIG. 5 a view of a mechanical-electrical drive from above;

FIG. 6 a perspective view of a mechanical-electrical drive.

DETAILED DESCRIPTION OF THE INVENTION

The principle sketch in FIG. 1 shows a mechanical-electrical drive for an electrical overhead track 40 as is represented in principle in FIG. 2. The mechanical-electrical drive comprises a brushless permanent magnet synchronous motor as drive motor 1, with a housing 9 and a motor shaft 2, which is extended one-sided out of the housing 9. Additionally located directly onto the motor shaft 2 is not more than one drive wheel 3. which is coupled free of transmission by positive or non-positive fit to the motor shaft 2. The mechanical-electrical drive further comprises a control and regulating unit 6, by means of which the drive motor 1 is supplied with AC current for the conveying performance.

The mechanical-electrical drive is flanged, by way of the housing 9 of the permanent magnet synchronous motor 1, to a carrier 8 for the conveying vehicle 4, suspended at which, by means of a receiver 83, the conveying vehicle 4 is suspended from the electrical overhead track 40. The weight force of the conveying vehicle 4, taking effect on the receiver 83, is transferred by way of the carrier 8 onto the housing 9, and from housing 9 by way of the bearings, not represented in greater detail, in the housing 9 of the permanent magnet synchronous motor 1, onto the motor shaft 2. From the motor shaft 2, the weight force is transferred by way of the sole drive wheel 3 onto a rail 51 of the system of the electrical overhead track 40. This therefore ensures that the motor shaft 2 of the permanent magnet synchronous motor 1 transfers the whole of the weight force taking effect on receiver 83 onto the sole drive wheel 3, and no further bearing means are necessary.

The motor shaft 2 rotates about an axis of rotation X, which is oriented at right angles to the conveying direction Rf of the mechanical-electrical drive and the electrical overhead track 40. Arranged in the carrier 8 are guide rollers 82, which provide bearing mounts for the mechanical-electrical drive in the direction of the axis of rotation X. For this purpose the guide rollers 82 are rotatably mounted about axles which are arranged at right angles to the axis of rotation X and at right angles to the conveying direction Rf.

The conveying vehicle 4 represented in FIG. 2, of the electrical overhead track 40, comprises a frame 41, which in the conveying direction Rf, in addition to the sole drive wheel 3, is suspended by a driveless roller 7 to the rail system 5. No more precise details of the mechanical arrangement of the driveless suspension system are represented.

Represented in FIG. 3 is a principle of an electrical overhead track 40, which has a rail system 5 with a rail 51. Suspended on the rail 51 are a number of conveying vehicles 4 and an auxiliary conveying vehicle 42. The electrical overhead track 40 is operated with alternating current at a voltage of between 350 volts [V] and 450 volts [V]. The conveying vehicles 4 are driven by a permanent magnet synchronous motor 1. The auxiliary conveying vehicle 42 has a conventional AC motor (WSM), without permanent magnet, as the drive motor 1, with a gear between the drive motor 1 and the drive wheel 3. According to the invention, therefore, mechanical-electrical drives with permanent magnet synchronous motors 1 and with AC motors can be integrated in the same system of an electrical overhead track 40, which is supplied with AC voltage.

Represented in the sectional representation according to FIG. 4 are details of the mechanical-electrical drive. The sliding contacts 81 necessary for the current transfer are arranged on one side of the double-T-shaped profile of the rail 51, partially in the rail 51. By means of the sliding contacts 81, the alternating current is fed into the control and regulating unit 6 arranged immediately adjacent, rectified, and provided to the permanent magnet synchronous motor 1 by means of current leads, not represented in any greater detail. The permanent magnet synchronous motor 1 is arranged, in relation to the rail 51, opposite the control and regulating unit 6 on the carrier 8, as a result of which, in relation to a plane running vertically through the middle of the rail 51, a balanced width of the mechanical-electrical drive is attained.

The motor shaft 2 is mounted in the housing 9 by means of cylinder roller bearings 91. The guide rollers 82 are secured to the carrier 8 by means of bearing journals 84. The control and regulating unit 6 is secured to the carrier 8 by means of an adapter 61.

In FIG. 5 the conveying direction Rf is to be seen, in which the mechanical-electrical drive mainly moves when in operation. Arranged in the conveying direction Rf in front of the carrier 8 is a bar 85. A perspective detail view according to FIG. 6 illustrates clearly the compact structure of the mechanical-electrical drive.

The invention claimed is:

1. A mechanical-electrical drive for a conveying element which can be operated in a power network with an AC voltage of between 350 volts [V] and 450 volts [V],
consisting of an electrical drive motor comprising a motor shaft and a control and regulating unit for the electrical drive motor and
not more than one drive wheel coupled to the motor shaft, wherein the electrical drive motor and the drive wheel can be positioned on a conveying element through a carrier and
only by way of the drive wheel, a drive torque as well as weight force taking effect on the carrier can be transferred directly onto a stationary component,
wherein the electrical drive motor, which comprises a housing, is configured as a brushless permanent magnet synchronous motor, and the drive wheel is coupled free of transmission to the motor shaft in such a way that the full weight force acting on the carrier is transferred onto the drive wheel through the housing and the motor shaft.

2. The mechanical-electrical drive according to claim 1, wherein the drive wheel and the motor shaft are arranged coaxially to an axis of rotation (X), wherein the drive wheel is coupled indirectly or directly to the motor shaft.

3. The mechanical-electrical drive according to claim 1, wherein the electrical drive motor has a power rating of between 100 watts [W] and 200 watts [W].

4. A method for driving a conveying vehicle or an electrical suspended track within a conveying path, comprising the steps of: using a mechanical-electrical drive according to claim 3 and the sole drive wheel drives on a stationary mounted rail or travel track.

5. A system consisting of one or more conveying elements, each of which comprises a mechanical-electrical drive according to claim 1, wherein the mechanical-electrical drive is mounted on the conveying element.

6. The system according to claim 5, wherein the conveying element is configured as a conveying vehicle or electrical overhead track for use within a conveying path, and a carrier is provided at the conveying element, mounted on which is the electrical drive motor its housing, wherein a whole of the weight force taking effect on the carrier is transferred onto the drive wheel via the housing and the motor shaft.

7. The system according to claim 6, wherein a plurality of sliding contacts are arranged on the carrier for the transfer of the AC voltage from the power network to the control and regulating unit, and further including a plurality of guide rollers for guiding the carrier in a direction parallel to the axis of rotation (X).

8. The system according to claim 7, wherein a guidance system or a rail system as the stationary component, and a control and regulating unit are provided for the electrical overhead track, wherein the guidance system or rail system has an operating voltage of between 350 volts [V] and 450 volts [V] AC.

9. The system according to claim 8, wherein the guidance system or a rail system forms at least one closed conveying circuit for the conveying vehicle.

10. The system according to claim 7, wherein not more than one driveless roller is provided in addition to the sole drive wheel of mechanical-electrical drive, and the entire weight of the electrical overhead track can be transferred onto the rail system via the sole drive wheel and the driveless roller.

11. The system according to claim 10, wherein the rail system comprises at least one suspended rail, and the electrical drive motor is positioned next to the rail in the axial direction of the axis of rotation.

12. Use of a mechanical-electrical drive according to claim 1 in combination with a conveying vehicle or an electrical overhead track within a conveying path, wherein the mechanical-electrical drive is mounted on the conveying vehicle or on the electrical overhead track, and on which the sole drive wheel rolls on a stationary mounted rail or on a travel track.

* * * * *